United States Patent [19]

Mark

[11] 4,403,087

[45] Sep. 6, 1983

[54] POLYCARBONATES CHAIN TERMINATED WITH SULFONIC ACID SALT CONTAINING PHENOLS

[75] Inventor: Victor Mark, Evansville, Ind.

[73] Assignee: General Electric Company, Mt. Vernon, Ind.

[21] Appl. No.: 306,186

[22] Filed: Sep. 28, 1981

[51] Int. Cl.³ ............................................. C08G 63/62
[52] U.S. Cl. .................................. 528/196; 525/462; 525/470; 528/171; 528/174; 528/198; 528/204
[58] Field of Search ............... 528/196, 198, 204, 171, 528/174; 525/462, 470

[56] References Cited

U.S. PATENT DOCUMENTS

| | | | |
|---|---|---|---|
| 4,188,475 | 2/1980 | Margotte | 528/175 |
| 4,195,156 | 3/1980 | Bruckdorfer | 528/196 |
| 4,285,855 | 8/1981 | Tokuda | 525/462 |

Primary Examiner—Harold D. Anderson
Attorney, Agent, or Firm—Martin B. Barancik

[57] ABSTRACT

Aromatic carbonate polymers are end-capped with a sulfonic acid salt substituted phenol in sufficient quantity to provide flame retardant activity.

6 Claims, No Drawings

POLYCARBONATES CHAIN TERMINATED WITH SULFONIC ACID SALT CONTAINING PHENOLS

BACKGROUND OF THE INVENTION

Flame resistant aromatic carbonate polymers are well known. Alkali metal salts of sulfonated compounds, particularly sulfonated aromatic compounds are particularly effective as flame retardant additives for aromatic carbonate polymers. These compounds, used in additive quantities, provide an aromatic carbonate polymer composition which is resistant to flammability, and can pass various Underwriter Laboratory test levels. Thus the usage of aromatic carbonate polymers has been expanded into areas where increased flame resistance is a requirement. However, because the compounds are employed as additives rather than incorporated into the actual polymer, several problems have occurred. The optical clarity of the resin, as measured by haze and transmission of light, has at times suffered somewhat from the addition of the additive quantities of a sulfonate salt.

The incorporation of the critical flame retardant functionality into the polymer itself should provide the physical compatibility necessary to overcome any optical clarity problem. Such incorporation has now been accomplished with the concurrent elimination of a separate end-capping agent. The moiety which provides flame resistance to the aromatic carbonate polymer has the dual function of end-capping the polymer as well.

SUMMARY OF THE INVENTION

In accordance with the invention there is a flame retarded, end-capped polymeric composition which comprises an aromatic carbonate polymer end-capped with a moiety derived from a compound of the formula of FIG. I of the Chart, located at the end of the specification, wherein X is O, S, SO, $SO_2$, CO, alkylene of one to four carbon atoms, inclusive, $CR_5R_6$ wherein $R_5$ and $R_6$ are the same or different and are hydrogen or alkyl of one to three carbon atoms, inclusive, $C=CR_7R_8$ wherein $R_7$ and $R_8$ are the same or different and are hydrogen, chloro or bromo;

n is 0 or 1;

Y is hydrogen or hydroxy;

Z is $SO_3^-R$ wherein R is a metal cation of oxidation number +1 or +2, with the proviso that Z is ortho to Y when Y is hydroxy;

$R_1$, $R_2$, $R_3$ and $R_4$ are the same or different and are hydrogen, alkyl of 1 to 3 carbon atoms, inclusive, chloro and bromo.

Compositions of this invention have better optical clarity in general than compositions wherein sulfonated aromatic compounds are present as additives. Flame retardance for the compositions of the invention is present as well.

DETAILED DESCRIPTION OF THE INVENTION

The term "aromatic carbonate polymer" is used in its usual sense throughout the application and claims.

Aromatic carbonate polymers are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)-propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis(4-hydroxyphenyl)sulfone and bis(4-hydroxyphenyl)sulfide. Other dihydric phenols of the bisphenol type are also available and are disclosed in U.S. Pat. Nos. 2,999,835; 3,028,365 and 3,334,154 and are herein incorporated by reference. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc., di-(alkylphenyl)carbonate such as di-(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by employing an acid acceptor and a catalyst.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetra-methyl ammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a poly-functional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl of mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

The resin is prepared in the usual manner as aforementioned but instead of using the common end-capping agents such as phenol, p-tertbutylphenol, or p-bromophenol, for example, an appropriate quantity of a compound of FIG. I is employed. The compounds are prepared by conventional methods known in the art.

Compounds of FIG. I wherein Y is hydroxy are readily prepared by sulfonating the appropriate bisphenol in solution or slurry with sulfur trioxide or chlorosulfonic acid. Water is added to the reaction mixture, the unreacted starting material removed by filtration and the aqueous phase is neutralized. The neutralized aqueous phase is stripped to dryness and extracted with methanol. The monosulfonic acid salt of FIG. I is more soluble in the methanol than the disulfonic acid salt, thereby affecting a separation of the monosulfonic acid salt. These steps are schematically described in the Chart, FIGS. II-IV.

Compounds of FIG. I wherein Y is hydrogen are also readily prepared, see the Chart, FIGS. V to VII. The aminophenol X substituted phenol, FIG. V, is reacted with nitrous acid and a xanthate to form the thiophenol of FIG. VI. This thiophenol is then oxidized to the sulfonic acid substituted compound of FIG. VII which is the free sulfonic acid of the FIG. I compounds. If necessary the hydroxy group can be protected by acyl groups during the reaction steps. Suitable oxidizing agents are organic or inorganic peracids. An example of an organic peracid is perbenzoic acid. An example of an inorganic peracid is potassium permanganate.

Compounds of FIG. I wherein Y is hydrogen and X is $CR_5R_6$ or alkylene can also be prepared by the direct alkylation of phenols as shown in the Chart at FIG. VIII through FIG. IX. The alkylation of phenols by benzylic alcohols or ethers is described in Friedel Crafts and Selected Reactions, Olah, Interscience Publications, New York, 1964, pgs. 477-595, Tables 7-9 and 19-20.

The quantity of the compound of FIG. I employed as the end-capping agent can vary, the amount present in the reaction medium being sufficient to provide an aromatic carbonate polymer possessing (1) an intrinsic viscosity between above 0.4, preferably between about 0.4 and 0.9; and (2) greater flame resistance than an aromatic carbonate polymer end-capped with the usual non-sulfonated agents.

Quantities of compounds of FIG. I of from about 0.01 to about 5.0, preferably from about 0.1 to about 0.5 mole percent of the dihydric phenol present are effective to accomplish these results.

The addition of the compound of FIG. I to the reaction vessel is done in the usual manner as practiced in the art although it is preferred to add the end-capping agent towards the end of the reaction sequence to inhibit the presence of emulsions. The end-capping agent of FIG. I can be used alone or in the presence of up to about 3.0 mole percent of the typical phenolic end-capping agents.

The compositions of the present invention may optionally contain other commonly known and used additives such as antioxidants; antistatic agents; mold release agents; colorants; glass fibers, impact modifiers; ultraviolet radiation absorbers such as the benzophenones and the benzotriazoles; fillers; plasticizers; hydrolytic stabilizers such as epoxides; color stabilizers such as organophosphites; and flame retardants.

Where examples of the invention are described below it is intended that these examples illustrate rather than limit the general nature of the invention.

EXAMPLE 1

Into a mixture of 2283 grams of pure 4,4'-isopropylidenediphenol (BPA) (mp 156°-157° C.; 10.0 mole grams), 5700 grams water, 9275 grams methylene chloride, 32.0 grams phenol and 10.0 grams triethylamine were introduced, at ambient temperature, 1180 grams phosgene over a period of 97 minutes while maintaining the pH of the two-phase system at about 11; i.e., pH 10-12.5, by simultaneously adding a 25% aqueous sodium hydroxide solution. At the end of the addition period, the pH of the aqueous phase was 11.7 and the BPA content of this phase was less than 1 part per million (ppm) as determined by ultraviolet anaylsis.

The methylene chloride phase was separated from the aqueous phase, washed with an excess of dilute (0.01 N) aqueous HCl and then washed three times with deionized water. The polymer was precipitated by steam and dried at 95° C. The resultant, pure BPA polycarbonate, which had an intrinsic viscosity (IV) in methylene chloride at 25° C. of 0.465 dl/g., was fed to an extruder, which extruder was operated at about 550° F., and the extrudate was comminuted into pellets.

The pellets were then injection molded at about 600° F. into test bars of about 5 in. by ½ in. by about ⅛ in. thick and into stepped test squares of about 2 in. by 2 in. by about ⅛ in. and 1/16 in. thick. The ⅛ in. test bars (5 for each test result shown in the Table) were subjected to the flame-retardancy test procedure set forth in Underwriter's Laboratories, Inc. Bulletin UL-94, Burning Test for Classifying Materials. In accordance with this test procedure, materials that pass the test are rated either V-0, V-1 or V-2 based on the results of 5 specimens. The criteria for each V (for vertical) rating per UL-94 is briefly as follows: Materials classed 94V-0 shall A. not have any specimens which burn with flaming combustion for more than 10 seconds after either application of the test flame.

B. not have a total flaming combustion time exceeding 50 seconds for the 10 flame applications for each set of five specimens.

C. not have any specimens which burn with flaming or glowing combustion up to the holding clamp.

D. not have any specimens which drip flaming particles that ignite the dry absorbent surgical cotton located 12 inches (305 mm) below the test specimen.

E. not have any specimens with glowing combustion which persists for more than 30 seconds after the second removal of the test flame. Materials classed 94V-1 shall A. not have any specimens which burn with flaming combustion for more than 30 seconds after either application of the test flame.

B. not have a total flaming combustion time exceeding 250 seconds for the 10 flame applications for each set of five specimens.

C. not have any specimens which burn with flaming or glowing combustion up to the holding clamp.

D. not have any specimens which drip flaming particles that ignite the dry absorbent surgical cotton located 12 inches (305 mm) below the test specimen.

E. not have any specimens with glowing combustion which persists for more than 60 seconds after the second removal of the test flame. Materials classed 94V-2 shall A. not have any specimens which burn with flaming combustion for more than 30 seconds after either application of the test flame.

B. not have a total flaming combustion time exceeding 250 seconds for the 10 flame applications for each set of five specimens.

C. not have any specimens which burn with flaming or glowing combustion up to the holding clamp.

D. be permitted to have specimens that drip flaming particles which burn only briefly, some of which ignite the dry absorbent surgical cotton placed 12 inches (305 mm) below the test specimen.

E. not have any specimens with glowing combustion which persists for more than 60 seconds after the second removal of the test flame.

If only one specimen from a set of five specimens fails to comply with the requirements, another set of five specimens shall be tested. In the case of the total number of seconds of flaming, an additional set of five specimens shall be tested if the totals are in the range of 51–55 seconds for 94V-0 and 251–255 seconds for 94V-1 and 94V-2. All specimens from this second set shall comply with the appropriate requirements in order for the material in that thickness to be classified 94V-0, 94V-1, or 94V-2.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification; otherwise, the 5 bars receive the rating of the worst single bar. For example, if one bar is classified as V-2 and the other four (4) are classified as V-0, then the rating for all bars is V-2. When subjected to the UL Bulletin-94 test, the bars of Example 1 were found to be burning.

EXAMPLE 2

Preparation of the potassium salt of bisphenol-A-2-sulfonic acid

To a slurry of 57.0 g (0.25 mole) of BPA (mp. 156°–157° C.) in 100 ml of 1,2-dichloroethane is added, dropwise, at ambient temperature and with good stirring 32.0 g (0.275 mole) of chlorosulfuric acid. Halfway through the addition another 100 ml portion of the solvent is added. After the gas evolution stops, the reaction mixture is stirred for an hour, after which it is added to 500 ml of water and the resultant slurry filtered through a sintered glass funnel. The filtrate consists of two phases, which are separated, the organic phase extracted with water and the extract combined with aqueous phase, which in turn is neutralized with potassium hydroxide to pH 7.0. It is then evaporated to dryness to yield the title salt.

EXAMPLE 3

Preparation of the sodium salt of 4,4'-biphenol-2-sulfonic acid

The procedure of Example 2 is repeated except that 46.6 g (0.25 mole) of p,p'-biphenol (mp. 277°–8° C.) is substituted for BPA and potassium hydroxide is replaced with sodium hydroxide.

EXAMPLE 4

Preparation of the potassium salt of 2,2'-dichloro-bisphenol-A-6-sulfonic acid

The procedure of Example 2 is repeated, except that 2,2'-dichloro-BPA (mp. 91°–92° C.), 74.3 g (0.25 mole) is substituted for BPA to yield the title compound.

EXAMPLE 5

Preparation of the potassium salt of 2-chloro-4,4'-isopropylidenediphenol-2'-sulfonic acid Repeating the procedure of Example 2 with 65.5 grams (0.25 mole) of 2chloro-4,4'-isopropylidenediphenol (mp. 105°–106° C.) in place of BPA and 22 g (0.275 mole) of sulfur trioxide in place of chlorosulfuric acid yields, after neutralization of the aqueous phase, the title salt as the main product.

EXAMPLE 6

Preparation of the potassium salt of 4,4'-thiodiphenol-2-sulfonic acid

When the procedure of Example 2 is repeated with 54.6 g (0.25 mole) of 4,4'-thiodiphenol in place of BPA, workup of the product yields the title salt.

EXAMPLE 7

The polymerization process of Example 1 is repeated, except that 28.0 g of potassium 4,4'-isopropylidenediphenol-2-sulfonate (described in Example 2) is used in place of phenol as chainstopper. A polymer will be prepared with an intrinsic viscosity greater than 0.40 dl/g and possessing greater flame resistance than the polymer of Example 1.

EXAMPLES 8–11

Repeating the polymerization process of Example 7 with an equal amount of moles, as in Example 7, of the chainstopper salt of Example 3, Example 4, Example 5, and Example 6, a polymer will be prepared for each case possessing an intrinsic viscosity of greater than 0.40 dl/g and greater flame resistance than the polymer of Example 1.

CHART
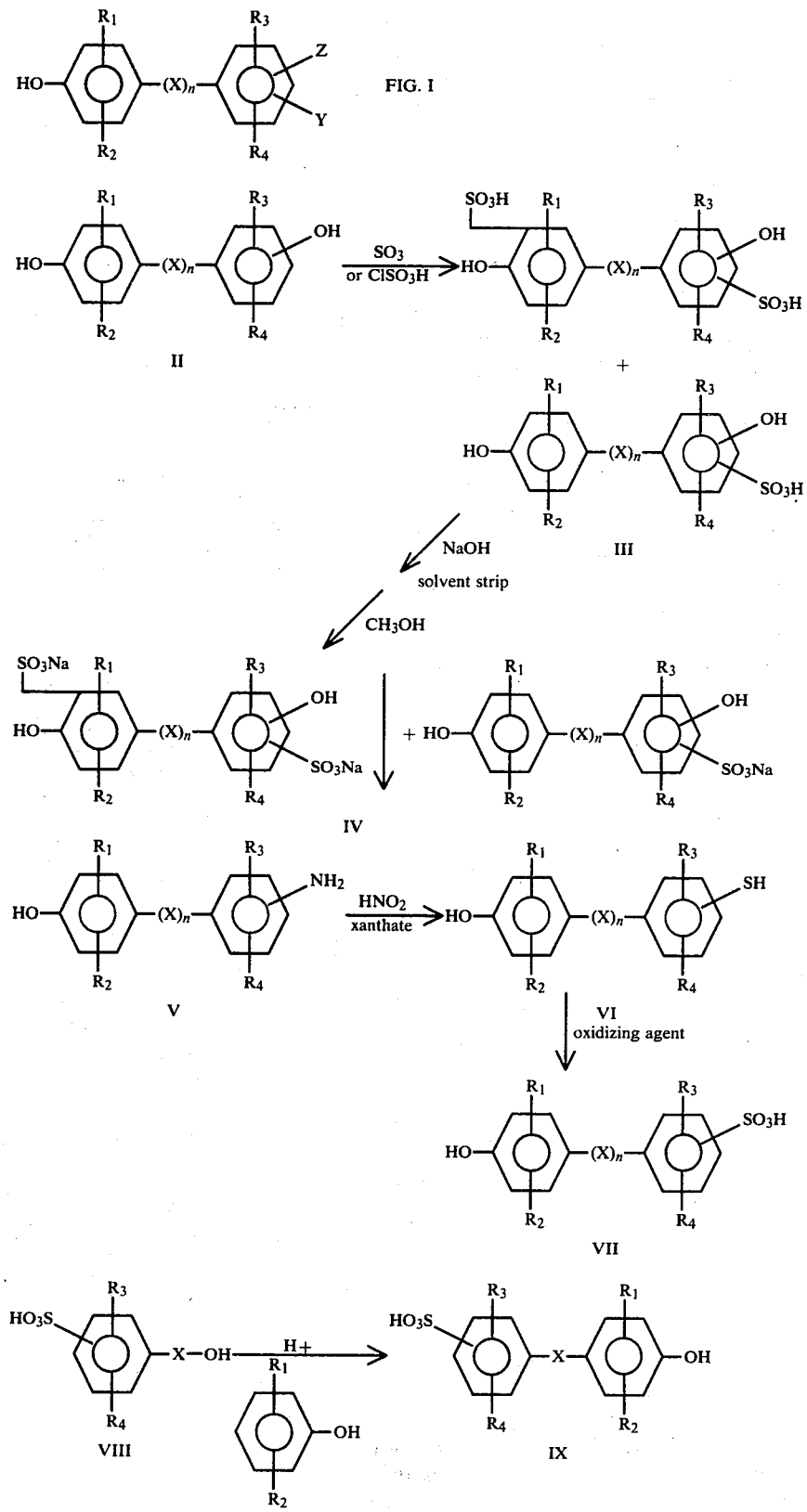
FIG. I
What is claimed is:

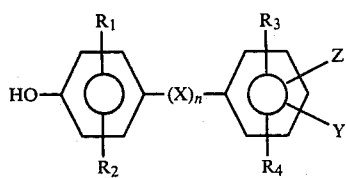

wherein
X is O; S; SO; CO; alkylene of one to four carbon atoms, inclusive; $CR_5R_6$ wherein $R_5$ and $R_6$ are the same or different and are hydrogen or alkyl of one to three carbon atoms, inclusive; $C=CR_7R_8$ wherein $R_7$ and $R_8$ are the same or different and are hydrogen, chlorine or bromine;
n is 0 or 1;

Y is hydrogen;
Z is $SO_3-R$ wherein R is a metal cation of oxidation number +1 or +2; and
$R_1$, $R_2$, $R_3$ and $R_4$ are the same or different and are hydrogen, alkyl of one to three carbon atoms, inclusive, chlorine or bromine.

2. A composition in accordance with claim 1 wherein R is a metal cation of oxidation number +1.

3. A composition in accordance with claim 1 wherein R is sodium or potassium.

4. A composition in accordance with claim 3 wherein n is 1.

5. A composition in accordance with claim 4 wherein X is $CR_5R_6$ and $R_5$ and $R_6$ are both methyl.

6. A composition in accordance with claim 5 wherein $R_1$, $R_2$, $R_3$ and $R_4$ are hydrogen.

* * * * *

UNITED STATES PATENT AND TRADEMARK OFFICE
CERTIFICATE OF CORRECTION

PATENT NO. : 4,403,087
DATED : September 6, 1983
INVENTOR(S) : Victor Mark

It is certified that error appears in the above-identified patent and that said Letters Patent are hereby corrected as shown below:

Claim 1 - column 9 - first part of claim is missing before drawing

"1. A composition which comprises an endcapped aromatic carbonate polymer resin derived solely from bisphenol-A and at least partially end-capped with a flame retardant imparting quantity of a moiety derived from a compound of the formula"

Signed and Sealed this

Second Day of July 1985

[SEAL]

Attest:

DONALD J. QUIGG

Attesting Officer

Acting Commissioner of Patents and Trademarks